United States Patent [19]

Garraway et al.

[11] Patent Number: 4,656,011

[45] Date of Patent: Apr. 7, 1987

[54] PROCESS OF TREATING NUCLEAR FUEL

[75] Inventors: John Garraway, Cockermouth; Peter D. Wilson, Seascale, both of England

[73] Assignee: British Nuclear Fuel plc, Cheshire, England

[21] Appl. No.: 698,415

[22] Filed: Feb. 5, 1985

[30] Foreign Application Priority Data

Feb. 13, 1984 [GB] United Kingdom ................. 8403724

[51] Int. Cl.$^4$ ..................... B01D 11/04; C01G 56/00; G21F 9/06

[52] U.S. Cl. ...................................... 423/10; 252/627; 252/631; 423/11; 423/18; 423/49; 423/250; 423/251; 423/253; 534/14

[58] Field of Search ....................... 252/631, 364, 627; 423/10, 8, 21.5, 54, 70, 253, 139, 250, 251, 2, 3, 11, 18, 49, 50; 534/14, 11, 10; 502/102, 103, 241, 300; 208/134, 136, 138

[56] References Cited

U.S. PATENT DOCUMENTS

| | | |
|---|---|---|
| 3,112,275 | 11/1963 | Pollock et al. ...................... 252/627 |
| 3,980,750 | 9/1976 | Cousinou et al. ................... 252/627 |
| 3,987,145 | 10/1976 | Bruns et al. ......................... 252/627 |
| 4,059,671 | 11/1977 | Schmieder et al. ................... 423/10 |
| 4,162,230 | 7/1979 | Horwitz et al. ....................... 252/627 |
| 4,229,421 | 10/1980 | Chapman et al. ..................... 423/10 |
| 4,333,912 | 6/1982 | Mills et al. ............................ 252/627 |

Primary Examiner—Stephen J. Lechert, Jr.
Assistant Examiner—Howard J. Locker
Attorney, Agent, or Firm—Larson and Taylor

[57] ABSTRACT

In the process for treating irradiated nuclear fuel to effect separation of uranium plutonium other higher actinides, and fission products, in which nitric acid treatment, followed by solvent extraction, then back-washing the reduction of tetra- and hexa-valent plutonium to the tri-valent form, then a second solvent extraction by which the tri-valent plutonium remains in the aqueous phase while uranium goes into the solvent phase, the reduction step is performed by hydrazine with or without tetra-valent uranium nitrate and catalyzed by technetium in the tetra-valent form with or without technetium in one or more higher valency states. The technetium can be present in the system as an irradiation product or be added to the process stream in a combined form.

7 Claims, 2 Drawing Figures

PROCESS OF TREATING NUCLEAR FUEL

This invention relates to the processing of irradiated nuclear fuel to bring about separation of uranium from plutonium and other higher actinides produced by the irradiation, and from fission products of the irradiation.

BACKGROUND OF THE INVENTION

The process broadly consists of the following steps. Firstly the irradiated fuel is dissolved in nitric acid. Then solvent extraction using tributyl phosphate in odourless kerosene is employed with the liquid from dissolution, by which uranium and plutonium and some technetium are extracted but the bulk of the other fission products and higher actinides are retained in the aqueous raffinate. Then the solvent phase is backwashed and reductant to reduce the plutonium to the trivalent state is added so that, when a second solvent extraction using the same solvent is performed, uranium goes into the solvent phase whilst plutonium remains in the aqueous raffinate, primary separation thus having been performed. Where the nuclear fuel is oxide fuel, some pre-dissolution steps have to be performed, but otherwise the process is the same.

The present invention is concerned with the reducing step referred to in the previous paragraph and an object of the invention is to diminish the requirement for extraneous metal ions as reducing agents.

FEATURES AND ASPECTS OF THE INVENTION

According to the invention, in the process of treating irradiated nuclear fuel to effect separation of uranium, plutonium, other higher actinides, and fission products, in which after treatment with nitric acid and solvent extraction with tributyl phosphate in odourless kerosene the solvent phase is backwashed and tetravalent and hexavalent plutonium are reduced to the trivalent form which on a second solvent extraction step remains in the aqueous raffinate whilst uranium goes into the solvent phase, the reduction step is performed by hydrazine with or without tetravalent uranium nitrate, and catalysed by technetium in the tetravalent form with or without technetium in one or more higher valency states.

The technetium can be present in the system by virtue of its production during irradiation of the nuclear fuel in a nuclear reactor, being converted to pertechnetate during the nitric acid dissolution step. Otherwise technetium in combined form such as the nitrate and/or as pertechnetate may be added to the process stream at a suitable position.

It is postulated that when technetium in the tetravalent form is added to a solution containing plutonium in the tetravalent form, the following reactions occur:

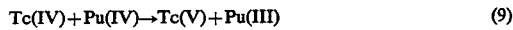  (9)

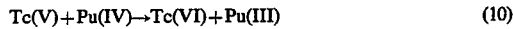  (10)

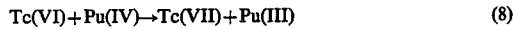  (8)

the last reaction (8) being the termination step.

The reduction of Pu(IV) by hydrazine is a very slow reaction at room temperature. In the presence of Tc(IV) and other low valency states of technetium, the reaction becomes rapid at room temperatures. The mechanics of the technetium/nitric acid/hydrazine system is thought to be a reaction the course of which involves four phases. The first phase is an initiation step in which any Tc(VII) is very slowly reduced by hydrazine to Tc(VI) or Tc(V) which are in turn reduced rapidly to Tc(IV). Tc(VII) may also be rapidly reduced by U(IV). Once a trace of Tc(IV) is produced, the second phase, the induction phase, commences in which Tc(IV) rapidly comproportionates with Tc(VII) to give Tc(V) and Tc(VI). This is the major reaction reducing Tc(VII). The next phase is a fast reaction which commences only when Tc(VII) has been substantially reduced to Tc(IV). The final phase is termination in which Tc(VI) and possibly Tc(V) is or are oxidised to Tc(VII).

DESCRIPTION OF THE DRAWINGS

The above reactions can be illustrated diagrammatically, see the accompanying drawings in which

In FIG. 1, the reference numeral 1 indicates the Tc(VII) to Tc(VI) part of the induction reaction hereinbefore referred to, 2 indicates the Tc(VI) to Tc(IV) part, 2+5 the Tc(VI) and Tc(V) to Tc(IV) part, 5 the Tc(VI) to Tc(IV) in the presence of nitrate ion 3 the comproportionation of Tc(IV) and Tc(VII) to give Tc(V) and Tc(VI) and 4 the slow reaction of Tc(IV) with nitrate ion to produce Tc(VI). 6 and 7 are the termination reactions of Tc(VI) and Tc(V) to Tc(VII), 8 (see above) is the termination reaction of Tc(VI) with Pu(IV) to give Tc(VII) and Pu(III), and 9 and 10 (see FIG. 2) are the equations indicated above.

Figure 1:
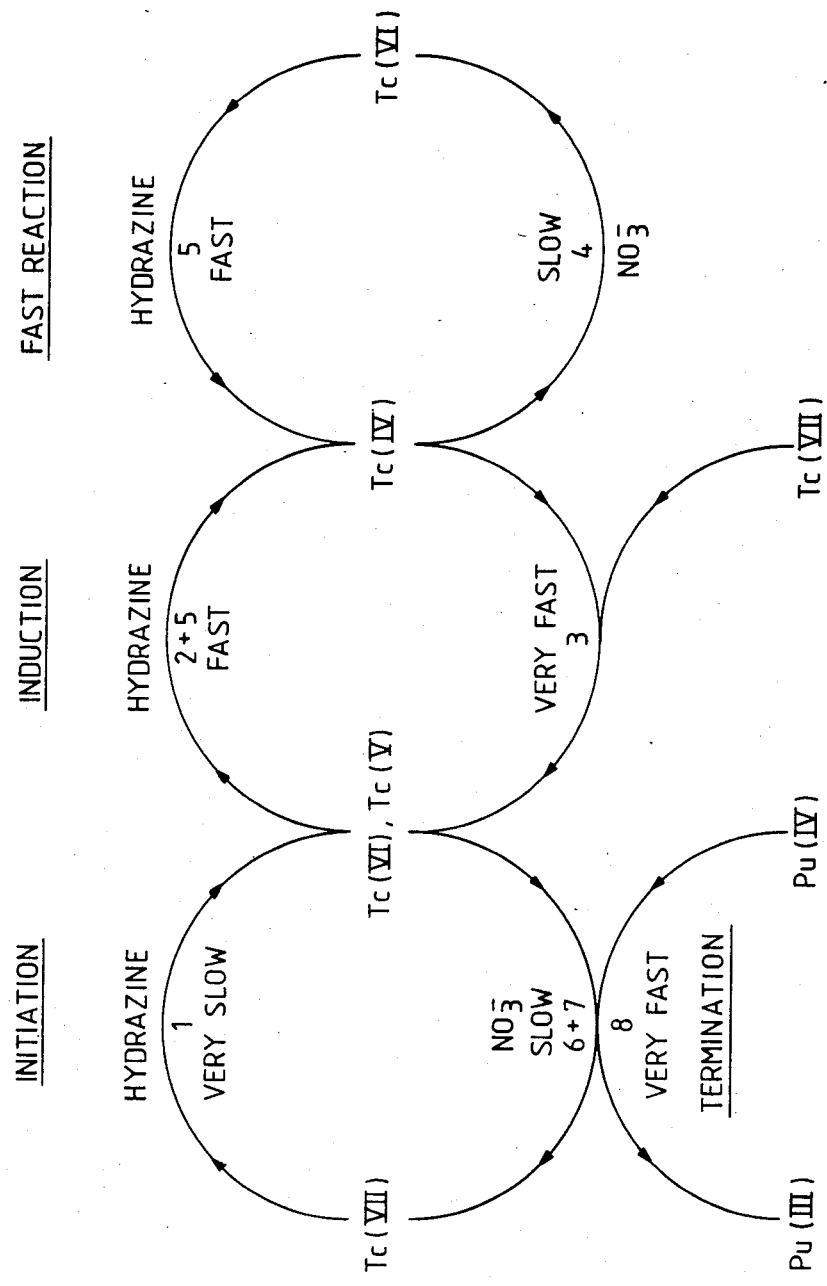
FIG. 1 illustrates the technetium/plutonium/hydrazine/nitric acid system, and FIG. 2 the technetium-catalysed reduction of Pu(IV).
Figure 2:
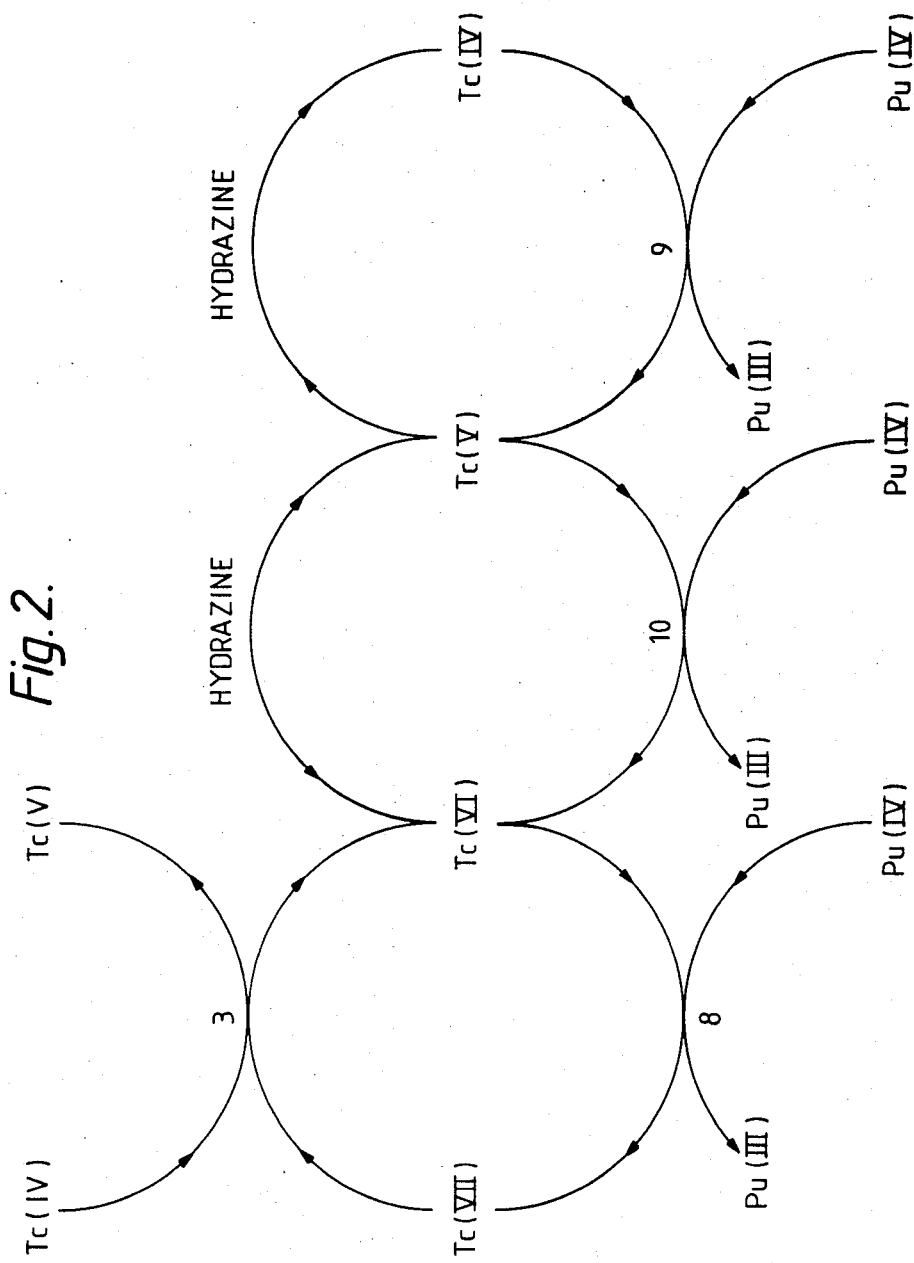

It was found that best results occurred between 1.2 and 2.2M $HNO_3$, the reduction rate decreasing at lower acidities. Reaction proceeded satisfactorily at 20° C. with a small increase in reduction rate when temperatures within the range 21°–35° C. were employed. Reduction rate also increased with increasing concentration of hydrazine, being satisfactory from 0.12M upwards. Increasing concentration of Pu(IV) (1.0–3.1 g/l) led to a decreased rate of reduction in percentage terms.

We claim:

1. In a process of treating irradiated nuclear fuel to effect separation of uranium, plutonium, other higher actinides, and fission products, in which after treatment with nitric acid and solvent extraction with tributyl phosphate in odorless kerosene the solvent phase is backwashed and tetravalent and hexavelent plutonium are reduced, in the presence of a reductant, to the trivalent form which after a second solvent extraction step remains in the aqueous raffinate whilst uranium goes into the solvent phase, the improvement wherein the reductant is selected from the group consisting of hydrazine, and hydrazine plus tetravalent uranium nitrate, and wherein the reduction step is is catalysed by a catalyst selected from the group consisting of technetium in the tetravalent form, and technetium in the tetravalent form plus technetium in at least one or more higher valency states.

2. A process according to claim 1, wherein the technetium is present in the system by virtue of its production during irradiation of the nuclear fuel in a nuclear reactor.

3. A process according to claim 1, wherein technetium in combined form is added to the process stream.

4. A process according to claim 3, wherein the technetium in combined form comprises the nitrate.

5. A process according to claim 3, where in the technetium in combined form comprises pertechnetate.

6. A process according to claim 3, wherein the technetium in combined form includes both nitrates and pertechnetate.

netium in combined form includes both nitrate and pertechnetate.

7. A process according to claim 1 wherein said reductant comprises hydrazine plus tetravalent uranium nitrate.

* * * * *